United States Patent
Funakawa et al.

(10) Patent No.: US 6,666,932 B2
(45) Date of Patent: Dec. 23, 2003

(54) HIGH STRENGTH HOT ROLLED STEEL SHEET

(75) Inventors: Yoshimasa Funakawa, Yokohama (JP); Tsuyoshi Shiozaki, Yokohama (JP); Kunikazu Tomita, Yokohama (JP); Takanobu Saito, Kawasaki (JP); Hiroshi Nakata, Fukuyama (JP); Kaoru Sato, Yokohama (JP); Minoru Suwa, Fukuyama (JP); Tetsuo Yamamoto, Yokohama (JP); Yasuhiro Murao, Kawasaki (JP); Eiji Maeda, Yokohama (JP)

(73) Assignee: NKK Corporation, Tokyo (JP)

( * ) Notice: Subject to any disclaimer, the term of this patent is extended or adjusted under 35 U.S.C. 154(b) by 16 days.

(21) Appl. No.: 10/108,691

(22) Filed: Mar. 28, 2002

(65) Prior Publication Data

US 2003/0063996 A1 Apr. 3, 2003

Related U.S. Application Data

(63) Continuation of application No. PCT/JP01/09469, filed on Oct. 29, 2001.

(30) Foreign Application Priority Data

| Oct. 31, 2000 | (JP) | 2000-331681 |
| Oct. 31, 2000 | (JP) | 2000-331682 |
| Jan. 31, 2001 | (JP) | 2001-022726 |
| Feb. 20, 2001 | (JP) | 2001-044351 |
| Feb. 20, 2001 | (JP) | 2001-044352 |
| Feb. 20, 2001 | (JP) | 2001-044354 |
| Feb. 20, 2001 | (JP) | 2001-044355 |
| Sep. 18, 2001 | (JP) | 2001-282774 |

(51) Int. Cl.$^7$ ............................. C22C 38/14; C22C 38/12

(52) U.S. Cl. ................. 148/328; 148/320; 148/333; 148/334; 428/659

(58) Field of Search ................... 148/328, 320, 148/333, 334; 428/659

(56) References Cited

U.S. PATENT DOCUMENTS

6,358,336 B1 * 3/2002 Miyata .................. 148/328
6,514,359 B2 * 2/2003 Kawano ................. 148/328

FOREIGN PATENT DOCUMENTS

| JP | 4-329848 A | 11/1992 |
| JP | 6-172924 A | 6/1994 |
| JP | 6-200351 A | 7/1994 |
| JP | 6-264185 A | 9/1994 |
| JP | 7-11382 A | 1/1995 |
| JP | 7-70696 A | 3/1995 |
| JP | 11-100641 A | 4/1999 |
| JP | 11-152544 A | 6/1999 |
| JP | 3039862 B2 | 3/2000 |
| JP | 2000-144259 A | 5/2000 |
| JP | 2000-273577 A | 10/2000 |

* cited by examiner

*Primary Examiner*—Deborah Yee
(74) *Attorney, Agent, or Firm*—Frishauf, Holtz, Goodman & Chick, P.C.

(57) ABSTRACT

The present invention relates to a high strength hot rolled steel sheet containing 0.15% or less C, 0.02 to 0.35% Ti, and 0.05 to 0.7% Mo by weight percentage and consisting essentially of a matrix of ferrite structure single phase and fine precipitates with a grain size of smaller than 10 nm dispersed in the matrix, for example, a high strength hot rolled steel sheet which consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo by weight percentage, and the balance being Fe, wherein fine precipitates with a grain size of smaller than 10 nm are dispersed in a matrix of ferrite structure single phase at a number per unit volume of $5 \times 10^4/\mu m^3$ or higher. This steel sheet, which has tensile strength of not lower than 550 MPa, high elongation and excellent stretch flangeability, is suitable for intricately shaped automotive chassis parts such as a suspension arm.

31 Claims, 6 Drawing Sheets

NUMBER PER UNIT VOLUME OF FINE CARBIDES ($\mu m^{-3}$)

HIGH STRENGTH HOT ROLLED STEEL SHEET

This application is a continuation application of International Application PCT/JP01/09469 (not published in English) filed on Oct. 29, 2001.

BACKGROUND OF THE INVENTION

1. Field of the Invention

The present invention relates to a high strength steel sheet suitable for automotive chassis parts or the like and, more particularly, to a high strength hot rolled steel sheet having tensile strength of not lower than 550 MPa, and to a method for manufacturing the same.

2. Description of Related Arts

From the viewpoint of increased fuel economy leading to environmental protection, hot rolled steel sheets for automobiles, having higher tensile strength and smaller thickness, have been developed. In particular, higher tensile strength and smaller thickness have been demanded for hot rolled steel sheets used for automotive chassis parts such as a suspension arm, to which a great effect of higher tensile strength and smaller thickness is obtained. On the other hand, since the automotive chassis parts have an intricate shape, the hot rolled steel sheet used for them is required to have high elongation and excellent stretch flangeability as well as high tensile strength.

Conventionally, various types of high strength hot rolled steel sheets used for automotive chassis parts have been proposed. For example, JP-A-4-329848 has disclosed a dual phase steel sheet having excellent fatigue property and stretch flangeability, which consists of a ferrite structure and a second phase (pearlite, bainite, martensite, retained austenite, etc.). However, sufficient stretch flangeability cannot be obtained because of the existence of the hard second phase.

JP-A-6-172924 has proposed a steel sheet having excellent stretch flangeability, which has a bainitic ferrite structure with high dislocation density. However, sufficient elongation cannot be obtained because of the existence of the bainitic ferrite structure with high dislocation density.

JP-A-6-200351 has proposed a steel sheet, consisting mainly of a polygonal ferrite structure, which has excellent stretch flangeability and is provided with high tensile strength by utilizing precipitation strengthening due to TiC or solid solution strengthening. However, high elongation and excellent stretch flangeability cannot be obtained steadily because much Ti must be added and thus coarse precipitates are yielded easily.

JP-A-7-11382 has proposed a steel sheet having excellent stretch flangeability, which has an acicular ferrite structure in which fine TiC or NbC is precipitated. However, sufficient elongation cannot be obtained because of the existence of the acicular ferrite structure with high dislocation density.

JP-A-11-152544 has proposed a steel sheet in which the grain size of ferrite is controlled to be as fine as 2 μm or smaller by adding Ti, Nb, V and Mo. However, high elongation cannot be obtained because of the fine grain size of ferrite of 2 μm or smaller.

SUMMARY OF THE INVENTION

An object of the present invention is to provide a high strength hot rolled steel sheet having high tensile strength of not lower than 550 MPa, high elongation, and excellent stretch flangeability, which is suitable for intricately shaped automotive chassis parts and a method for manufacturing the same.

The object of the present invention can be achieved by a high strength hot rolled steel sheet containing 0.15% or less C, 0.02 to 0.35% Ti, and 0.05 to 0.7% Mo by weight percentage and consisting essentially of a matrix of ferrite structure single phase and fine precipitates with a grain size smaller than 10 nm dispersed in the matrix. More concretely, the object thereof can be achieved by the following high strength hot rolled steel sheets.

(1) A high strength hot rolled steel sheet which consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo by weight percentage, and the balance being Fe, wherein fine precipitates with a grain size smaller than 10 nm are dispersed in a matrix of ferrite structure single phase at a number per unit volume of $5 \times 10^4 / \mu m^3$ or higher.

(2) A high strength hot rolled steel sheet which consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo, at least one element selected from 0.08% or less Nb and 0.15% or less V by weight percentage, and the balance being Fe, wherein fine precipitates with a grain size smaller than 10 nm are dispersed in a matrix of ferrite structure single phase at a number per unit volume of $5 \times 10^4 / \mu m^3$ or higher.

(3) A high strength hot rolled steel sheet which consists essentially of more than 0.06% and 0.15% or less C, 0.5% or less Si, 0.5 to 2.0% Mn, 0.06% or less P, 0.005% or less S, 0.1% or less Al, 0.006% or less N, more than 0.10% and 0.35% or less Ti, 0.3 to 0.7% Mo by weight percentage, and the balance being Fe, wherein fine precipitates with a grain size smaller than 10 nm are dispersed in a matrix of ferrite structure single phase at a number per unit volume of $5 \times 10^4 / \mu m^3$ or higher.

The above-described high strength hot rolled steel sheets can be manufactured, for example, by a method comprising the steps of: producing a hot rolled steel sheet by hot rolling a steel slab having the above-described compositions at a temperature of Ar3 transmission point or higher; and coiling the hot rolled steel sheet at a temperature of 550 to 700° C.

DETAILED DESCRIPTION OF THE INVENTION

The inventors conducted studies on the elongation and the stretch flangeability of a high strength hot rolled steel sheet, and, as a result, obtained the knowledge described below.

(1) Precipitates of carbide, nitride, etc. are made fine by the addition of Mo.

(2) If the precipitates of carbide, nitride, etc. are dispersed finely in a matrix of ferrite structure single phase with low dislocation density and high ductility by the addition of Mo, high elongation and excellent stretch flangeability as well as high tensile strength can be achieved at the same time.

Based on this knowledge, we found that 0.15% or less C, 0.02 to 0.35% Ti, and 0.05 to 0.7% Mo by weight percentage, the matrix made essentially of a ferrite structure single phase, and fine precipitates with a grain size smaller than 10 nm dispersed in the matrix allow to produce a hot rolled steel sheet having high tensile strength and excellent stretch flangeability.

The reasons for the limitation of contents of C, Ti and Mo are as described below.

If the content of C is higher than 0.15%, the fine precipitates are sometimes liable to become coarse, and thus the strength decreases. Therefore, the content of C should be 0.15% or lower.

If the content of Ti is smaller than 0.02%, the amount of fine precipitates is small, and thus it is difficult to obtain tensile strength of not lower than 550 MPa. If the Ti content is higher than 0.35%, the ferrite structure becomes fine, and thus the total elongation is liable to decrease. Therefore, the content of Ti should be in the range of 0.02 to 0.35%.

If the content of Mo is 0.05% or higher, fine composite precipitates combining with Ti are deposited while pearlite transformation is restrained, and thus the steel can be strengthened while maintaining high elongation and excellent stretch flangeability. However, if the Mo content is higher than 0.7%, a hard phase is formed, and thus the stretch flangeability degrades. Therefore, the content of Mo should be in the range of 0.05 to 0.7%.

In the present invention, the ferrite structure single phase need not always consist of a 100% ferrite phase. If the ferrite phase is 95% or more, the object of the present invention can be achieved.

Also, if the grain size of fine precipitates deposited in the matrix is 10 nm or larger, tensile strength of not lower than 550 MPa can hardly be obtained. Therefore, if an attempt is made to strengthen the steel by the precipitates with a grain size of 10 nm or larger, the volume percentage of precipitates must be increased. Thereby, the ferrite structure is made fine, and thus the elongation is decreased. Therefore, the grain size of fine precipitates should be smaller than 10 nm, preferably 5 nm or smaller. To achieve higher tensile strength, the grain size of fine precipitates should preferably be 3 nm or smaller.

The fine precipitates are composite carbides containing Ti and Mo. It is thought that since Mo, which has lower diffusion rate than Ti, forms carbides together with Ti, the growth rate of the carbides becomes low, so that fine carbides are deposited.

Even if W with a content in the range of 0.01 to 1.5% is added in place of Mo, or together with Mo, fine precipitates with a grain size smaller than 10 nm can be deposited, and thus a high strength hot rolled steel sheet having high elongation, excellent stretch flangeability and tensile strength of not lower than 550 MPa can be obtained.

Figure 1:
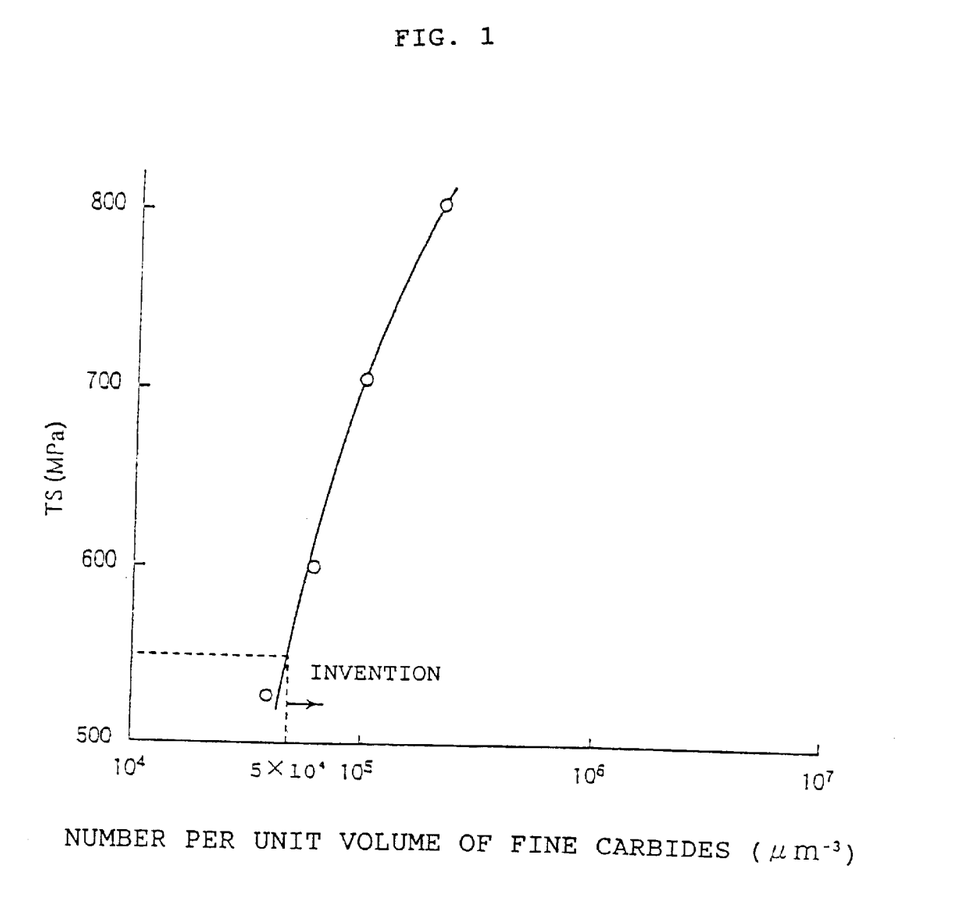
FIG. 1 is a graph showing the relationship between TS and number per unit volume of fine carbides.

Since the amount of fine precipitates exerts a great influence on the strength, the relationship between amount of fine precipitates and tensile strength TS was investigated using hot rolled steel sheets with a thickness of 2.3 mm which contained 0.03 to 0.15% C, 0.03 to 0.25% Ti, and trace to 0.7% Mo, and were hot rolled at a finishing temperature of 900° C. and coiled at a coiling temperature of 500 to 800° C. As a result, it is found that as shown in FIG. 1, if the number per unit volume of fine precipitates with a grain size smaller than 10 nm is $5 \times 10^4/\mu m^3$ or larger, TS of not lower than 550 MPa can surely be obtained, if the number thereof is $1 \times 10^5/\mu m^3$ or larger, TS of not lower than 700 MPa can surely be obtained, and if the number thereof is $2 \times 10^5/\mu m^3$ or larger, TS of not lower than 780 MPa can surely be obtained.

Figure 2:
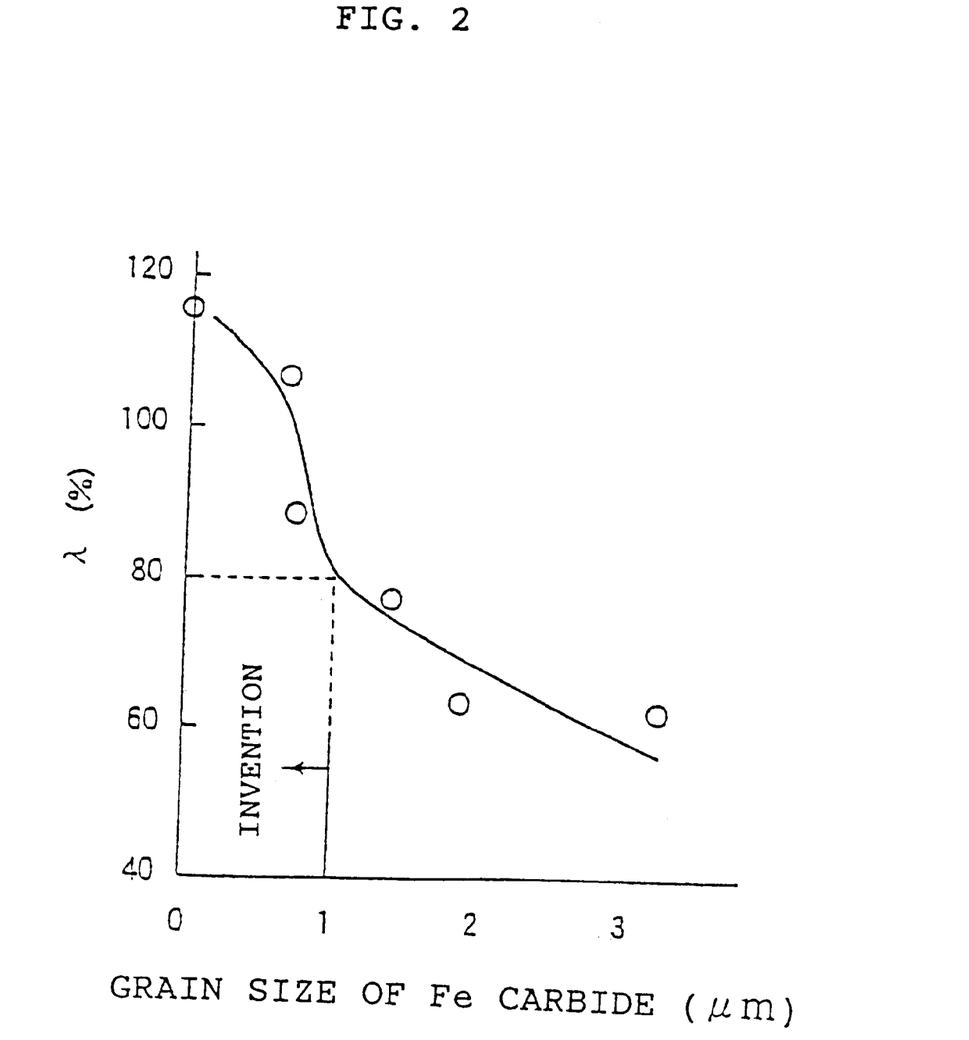
FIG. 2 is a graph showing the relationship between grain size of Fe carbide and λ.
Figure 3:
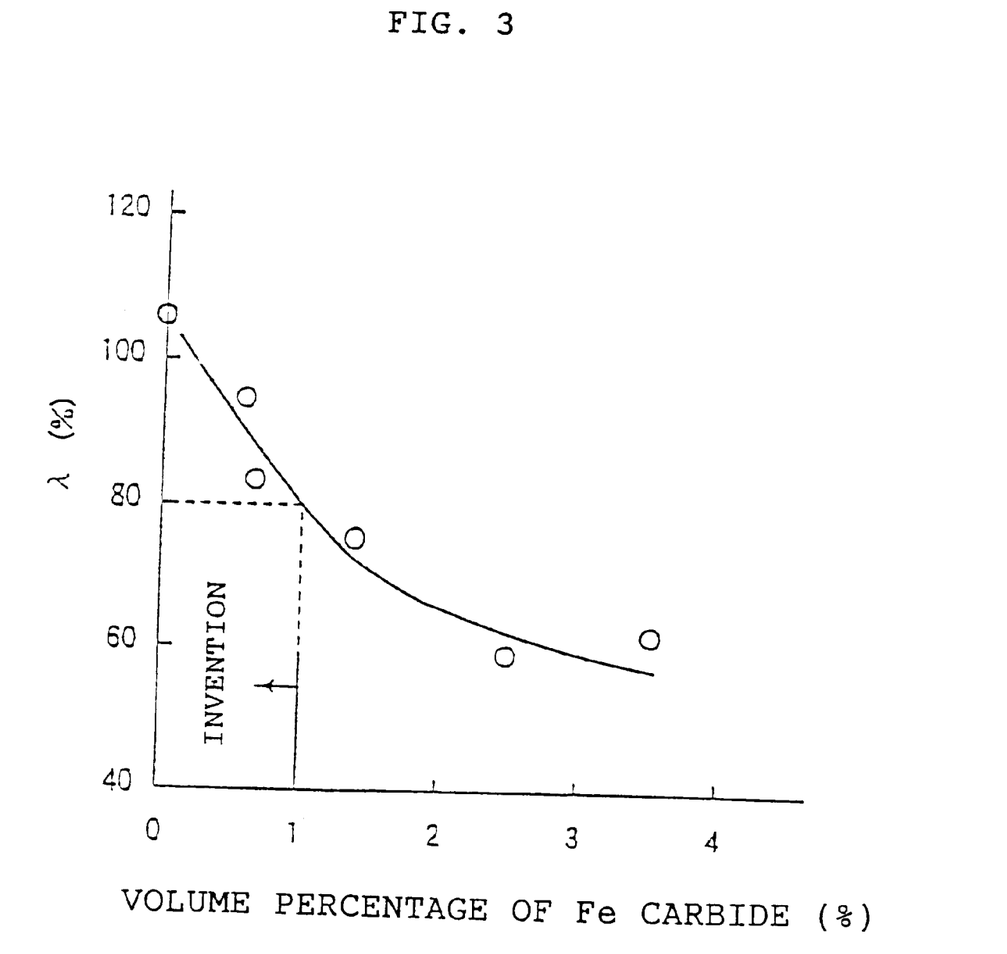
FIG. 3 is a graph showing the relationship between volume percentage of Fe carbide and λ.

The high strength hot rolled steel sheet in accordance with the present invention sometimes contains Fe carbides with a relatively large grain size in addition to the fine precipitates with a grain size of smaller than 10 nm. Since the Fe carbides with a large grain size is undesirable for stretch flangeability, the relationship between grain size (average grain size) and volume percentage of Fe carbides and stretch flangeability was investigated using the above-described hot rolled steel sheets. In this investigation, the grain size (average grain size) and volume percentage of Fe carbides were determined by image analysis after the observation under an electron microscope. Also, the stretch flangeability was evaluated as follows. A specimen having a hole was blanked with a clearance of 12.5% in the center of a steel sheet of 130 mm square by using a punch of 10 mm in diameter, and the blanked hole was pushed up from the burr-free side. Then, a hole diameter was measured at the time when cracking passed through the steel sheet, and evaluation was made by a hole expanding ratio λ expressed by the following equation.

$$\lambda(\%) = [(d-10)/10] \times 100$$

FIG. 2 shows the relationship between grain size of Fe carbides and hole expanding ratio. FIG. 3 shows the relationship between volume percentage of Fe carbides and hole expanding ratio.

It is found that if the grain size of Fe carbides exceeds 1 μm or if the volume percentage of Fe carbides exceeds 1%, λ becomes lower than 80%, and thus the stretch flangeability degrades. Therefore, it is preferable that the grain size of Fe carbides be smaller than 1 μm, and the volume percentage thereof be 1% or lower.

If the contents of C, Ti and Mo expressed by weight percentage satisfy the equation of $0.8 \leq (C/12)/[(Ti/48)+(Mo/96)] \leq 1.3$, fine precipitates with a grain size of smaller than 10 nm are surely formed at a number per unit volume of $5 \times 10^4/\mu m^3$ or higher. Also, If the contents of Ti and Mo expressed by atomic percentage in the fine precipitates satisfy the equation of $0.1 \leq Ti/Mo \leq 3$, fine precipitates with a grain size of smaller than 10 nm are surely formed at a number per unit volume of $5 \times 10^4/\mu m^3$ or higher, so that tensile strength of not lower than 550 MPa can surely be obtained. Further, in order to achieve higher tensile strength, the equation of $0.5 \leq Ti/Mo \leq 2$ should preferably be satisfied.

Even if in addition to C, Ti and Mo, at least one element selected from 0.08% or less Nb and 0.15% or less V is contained, the same effect can be obtained. In this case, however, the contents of Ti, Mo, Nb and V expressed by atomic percentage in the fine precipitates must satisfy the equation of $0.25 \leq Mo/(Ti+Nb+V+Mo)$.

Similarly, in the case where W is contained in place of Mo, if the contents of Ti and W expressed by atomic percentage in the fine precipitates satisfy the equation of $0.1 \leq Ti/W$, fine precipitates with a grain size smaller than 10 nm are surely formed at a number per unit volume of $5 \times 10^4/\mu m^3$ or higher.

Also, if both Mo and W are contained, if the equation of $0.1 \leq Ti/(Mo+W)$ is satisfied, fine precipitates with a grain size of smaller than 10 nm are surely formed at a number per unit volume of $5 \times 10^4/\mu m^3$ or higher.

If the ratio of element contents in the fine precipitates is controlled in this manner, not only the number of fine precipitates but also the dispersion state thereof is made homogeneous, so that more homogeneous tensile characteristic values can be obtained in the steel sheet, and also the sheet shape after rolling becomes good.

The investigation on the structure and the fine precipitates in the present invention was made by the method described below.

A specimen was prepared by the electrolytic polishing process using the twin jet method, and observation was made under a transmission electron microscope at an acceleration voltage of 200 kV. At this time, the observation was made by the defocus method in which the crystal orientation of parent phase was controlled so that the fine precipitates had a measurable contrast with the fine precipitates, and the focus was shifted from the normal focus to decrease the miscount of precipitates to the minimum. Also, the thickness of specimen in a zone in which the precipitate grain was measured was evaluated by measuring an elastic scattering peak and an inelastic scattering peak by using the electric energy loss spectroscopy. By this method, the number of grains and the thickness of specimen can be measured for the same zone. The number of grains was measured at four locations in a zone of 0.5×0.5 $\mu$m of the specimen, and was calculated as the number of grains observed by being projected per 1 $\mu m^2$. From this value and the thickness of specimen, the number of precipitate grains per 1 $\mu m^2$ was calculated. Also, chemical analysis of precipitates was performed by the energy dispersive X-ray spectroscopy.

As examples of high strength hot rolled steel sheet in accordance with the present invention, the following high strength hot rolled steel sheets can be cited.

(1) A high strength hot rolled steel sheet which consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo by weight percentage, and the balance being Fe, wherein fine precipitates with a grain size of smaller than 10 nm are dispersed in a matrix of ferrite structure single phase at a number per unit volume of $5 \times 10^4/\mu m^3$ or higher.

(2) A high strength hot rolled steel sheet which consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo, at least one element selected from 0.08% or less Nb and 0.15% or less V by weight percentage, and the balance being Fe, wherein fine precipitates with a grain size of smaller than 10 nm are dispersed in a matrix of ferrite structure single phase at a number per volume of $5 \times 10^4/\mu m^3$ or higher.

(3) A high strength hot rolled steel sheet which consists essentially of more than 0.06% and 0.15% or less C, 0.5% or less Si, 0.5 to 2.0% Mn, 0.06% or less P, 0.005% or less S, 0.1% or less Al, 0.006% or less N, more than 0.10% and 0.35% or less Ti, 0.3 to 0.7% Mo by weight percentage, and the balance being Fe, wherein fine precipitates with a grain size of 10 nm or smaller are dispersed in a matrix of ferrite structure single phase at a number per unit volume of $5 \times 10^4/\mu m^3$ or higher.

The steel sheets of (1) and (2) are high strength hot rolled steel sheets having tensile strength of not lower than 780 MPa, and the steel sheet of (3) is a high strength hot rolled steel sheet having tensile strength of not lower than 950 MPa.

The following is a description of the reasons for the limitation of composition.

C: C forms carbides, and is effective in strengthening the steel depending on the contents of Ti, Mo, Nb and V described later. However, in the case of a steel sheet having tensile strength of around 780 MPa, if the content of C is higher than 0.06%, pearlite is formed or the precipitate becomes coarse, so that the elongation and the stretch flangeability deteriorate. Therefore, the content of C should be 0.06% or lower. On the other hand, in the case of a steel sheet having tensile strength of around 980 MPa, the content of C should be 0.15% or lower for the same reason, and the content should be higher than 0.06% to obtain tensile strength of around 980 MPa. Therefore, the content of C should be higher than 0.06% and 0.15% or lower. Also, it is desirable that the relationship between the content of C and the later-described contents of Ti and Mo should satisfy $0.8 \leq (C/12)/[(Ti/48)+(Mo/96)] \leq 1.3$. By satisfying the above-described equation, fine composite carbides containing Ti and Mo can be precipitated, and the deterioration in elongation and stretch flangeability caused by the formation of pearlite or coarse precipitates can be restrained.

Si: Si is an element effective for solid solution strengthening. However, if the content of Si is higher than 0.5%, the precipitation of C from ferrite is accelerated, and thus coarse Fe carbides are liable to precipitate on grain boundaries, so that the stretch flangeability degrades. Also, if the content of Si is higher than 0.5%, the hot rolling of thin steel sheets with a thickness of 2.5 mm or smaller becomes unstable. Therefore, the Si content should be 0.5% or lower.

Mn: The content of Mn should be 0.5% or higher from the viewpoint of solid solution strengthening. However, if the content is higher than 2.0%, segregation occurs or a hard phase is formed, so that the stretch flangeability degrades. Therefore, the content of Mn should be in the range of 0.5 to 2.0%.

P: P is effective for solid solution strengthening. However, if the content of P is higher than 0.06%, segregation occurs, so that the stretch flangeability degrades. Therefore, the content of P should be 0.06% or lower.

S: A lower content of S is more desirable. If the content of S is higher than 0.005%, the stretch flangeability deteriorates. Therefore, the content of S should be 0.005% or lower.

Al: Al is added as a deoxidizer. If the content of Al is higher than 0.1%, both of the elongation and the stretch flangeability deteriorate. Therefore, the content of Al should be 0.1% or lower.

N: A lower content of N is more desirable. If the content of N is higher than 0.006%, coarse nitrides increase, so that the stretch flangeability degrades. Therefore, the content of N should be 0.006% or lower.

Ti: As described above, Ti forms fine composite carbides, and thus strengthens the steel while the high elongation and the excellent stretch flangeability are maintained. In the case of a steel sheet having tensile strength of around 780 MPa, the content of Ti should be in the range of 0.02 to 0.10%, and in the case of a steel sheet having tensile strength of around 950 MPa, the content of Ti should be higher than 0.10% and 0.35% or lower.

Mo: For the same reason as that in the case of Ti, in the case of a steel sheet having tensile strength of around 780 MPa, the content of Mo should be in the range of 0.05 to 0.6%, and in the case of a steel sheet having tensile strength of around 950 MPa, the content of Mo should be in the range of 0.3 to 0.7%.

In the case of a steel sheet having tensile strength of around 780 MPa, at least one element selected from 0.08% or less Nb and 0.15% or less V can further be contained. Nb and V are effective in making the structure fine, and also form composite precipitates together with Ti and Mo, which contributes to the increase in elongation and stretch flangeability. However, if the content of Nb is higher than 0.08%, or if the content of V is higher than 0.15%, the elongation decreases. Therefore, the content of Nb should be 0.08% or lower, and the content of V should be 0.15% or lower. From the viewpoint of the formation of fine structure by using Nb and V, it is preferable that the content of Nb should be 0.005% or higher and the content of V should be 0.001% or higher.

As concrete examples of high strength hot rolled steel sheet in accordance with the present invention, the following hot rolled steel sheets containing W can be cited in addition to the above-described three types of high strength hot rolled steel sheets.

(4) A high strength hot rolled steel sheet which consists essentially of 0.1% or less C, 0.5% or less Si, 2% or less Mn, 0.06% or less P, 0.01% or less S, 0.1% or less Al, 0.006% or less N, 0.5% or less Cr, 0.02 to 0.2% Ti, 0.08% or less Nb, 0.01 to 1.5% W by weight percentage, and the balance being Fe, wherein fine precipitates having a grain size of smaller than 10 nm are dispersed in a matrix of ferrite structure single phase at a number per volume of $5 \times 10^4/\mu m^3$ or higher and the contents of Ti and W represented by atomic percentage in the precipitates satisfy the equation of $0.1 \leq Ti/W$.

(5) A high strength hot rolled steel sheet which consists essentially of 0.1% or less C, 0.5% or less Si, 2% or less Mn, 0.06% or less P, 0.01% or less S, 0.1% or less Al, 0.006% or less N, 0.5% or less Cr, 0.02 to 0.2% Ti, 0.08% or less Nb, 0.05 to 0.6% Mo, 0.01 to 1.5% W by weight percentage, and the balance being Fe, wherein fine precipitates having a grain size of smaller than 10 nm are dispersed in a matrix of ferrite structure single phase at a number per volume of $5 \times 10^4/\mu m^3$ or higher and the contents of Ti, Mo and W represented by atomic percentage in the precipitates satisfy the equation of $0.1 \leq Ti/(Mo+W)$.

In the above-described high strength hot rolled steel sheets (1) to (5), as shown in the later-described example 7, if the content of solid solution C is 0.0020% or lower, the elongation increases further.

Figure 4:
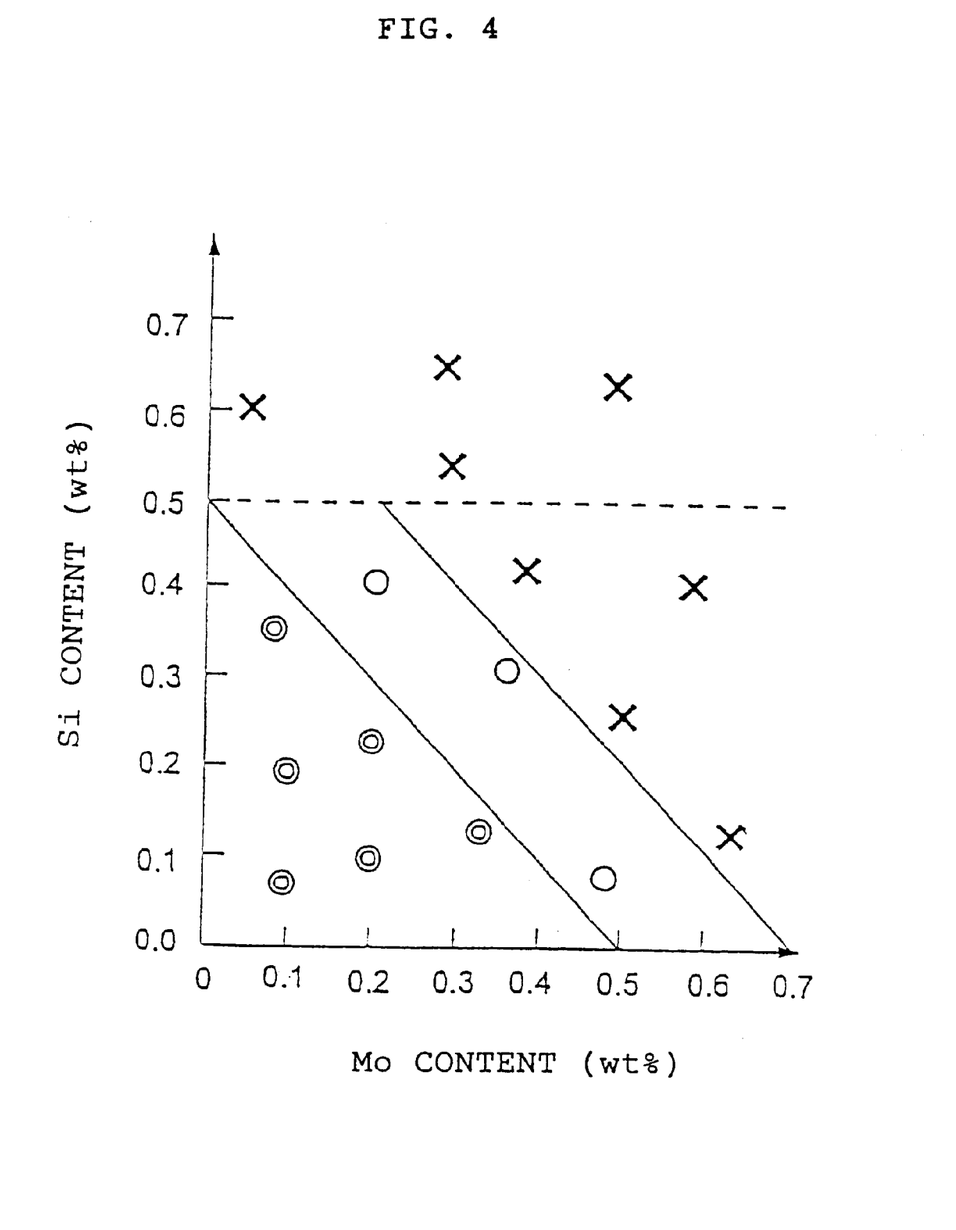
FIG. 4 is a graph showing the relationship between Si and Mo contents and surface property.

FIG. 4 shows the relationship between contents of Si and Mo and surface property. In this figure, ⊙ indicates very good degree of scale defect caused by Si, ○ indicates good degree, and X indicates poor degree.

In the above-described high strength hot rolled steel sheets (1) to (5), if the contents of Si and Mo by weight percentage satisfy the equation of $(Si+Mo) \leq 0.5\%$, a very good surface property can be obtained.

Even if at least one element selected from 0.15% or less Cr. 0.15% or less Cu, and 0.15% or less Ni is contained, the effects of the present invention can be achieved.

The above-described high strength hot rolled steel sheet (1) can be manufactured by a method for manufacturing a high strength hot rolled steel sheet, which comprises the steps of: producing a hot rolled steel sheet by hot rolling a steel slab, which consists essentially of, for example, 0.06% or less C, 0.5% or less Si, 0.5 to 2.0% Mn, 0.06% or less P, 0.005% or less S, 0.1% or less Al, 0.006% or less N, 0.05 to 0.6% Mo, 0.02 to 0.10% Ti by weight percentage, and the balance being Fe, and satisfies the equation of $0.8 \leq (C/12)/[(Ti/48)+(Mo/96)] \leq 1.3$, at a temperature of Ar3 transformation point or higher; and coiling the hot rolled steel sheet at a temperature of 550 to 700° C.

The above-described high strength hot rolled steel sheet (2) can be manufactured by producing a steel slab, which consists essentially of, for example, 0.06% or less C, 0.5% or less Si, 0.5 to 2.0% Mn, 0.06% or less P, 0.005% or less S, 0.1% or less Al, 0.006% or less N, 0.05 to 0.6% Mo, 0.02 to 0.10% Ti, at least one element selected from 0.08% or less Nb and 0.15% or less V by weight percentage, and the balance being Fe, under the same hot rolling conditions as those for the steel sheet (1).

The above-described high tensile hot rolled steel sheet (3) can be manufactured by producing a steel slab, which consists essentially of, for example, more than 0.06% and 0.15% or less C, 0.5% or less Si, 0.5 to 2.0% Mn, 0.06% or less P, 0.005% or less S, 0.1% or less Al, 0.006% or less N, more than 0.10% and 0.35% or less Ti, 0.3 to 0.7% Mo by weight percentage, and the balance being Fe, and satisfies the equation of $0.8 \leq (C/12)/[(Ti/48)+(Mo/96)] \leq 1.3$, under the same hot rolling conditions as those for the steel sheet (1).

If the hot rolling is performed at a temperature lower than Ar3 transformation point, coarse grains are produced, and thus the elongation decreases, and the precipitates are made coarse by a strain inducing phenomenon. Therefore, the hot rolling must be performed at a temperature of Ar3 transformation point or higher, preferably, at a temperature of 880° C. or higher. After the hot rolling, in order to provide a ferrite structure single phase, the steel sheet must be coiled at a temperature of 550° C. or higher, preferably at a temperature of 600° C. or higher. Also, in order to prevent the precipitates from becoming coarse, the steel sheet must be coiled at a temperature of 700° C. or lower, preferably, at a temperature of 660° C. or lower.

The steel slab can be rolled by the direct rolling method in which hot rolling is performed immediately after casting or after heat retention. Alternatively, it can be rolled by the continuous rolling method in which the rolled steel is heated or heat-retained before or during finish rolling, or the rolled steels are joined after rough rolling.

The above-described high tensile hot rolled steel sheet (1) to (5) can be subjected to hot dip galvanizing treatment. For the high strength hot rolled steel sheet in accordance with the present invention, since stable fine precipitates are dispersed, even if the hot dip galvanizing treatment is accomplished, the precipitates do not change, and thus the steel sheet does not soften.

Since the automotive chassis parts such as a suspension arm, a reinforcement, a side member, a seat frame, and a seat rail have an intricate shape, it is difficult to fabricate these parts by press forming the conventional high strength hot rolled steel sheet. However, if the above-described high tensile hot rolled steel sheets (1) to (5) are applied, these parts can be fabricated with high quality and high yields.

In particular, a high strength hot rolled steel sheet which has hole expanding ratio of 80% or higher and tensile strength TS of 700 MPa or higher and in which TS, elongation EL (%), and sheet thickness t (mm) satisfy the equation of $(TS \times EL)/t^{0.2} > 12000$ is suitable for the automotive chassis parts for the reason described below.

The product of TS and EL, TS×EL, serves as an index of absorbed energy of material, and is effective as an index representing the difficulty in developing press cracking. The value required for this differs according to TS of steel sheet. Also, since EL is a value that depends on the sheet thickness t, a desirable range of TS×EL represented as a function of t that does not cause a problem of press cracking due to insufficient EL exists for each TS. The EL of steel sheet with a different t can be converted by using Oliver's equation, and is proportional to $t^{0.2}$.

Figure 5:
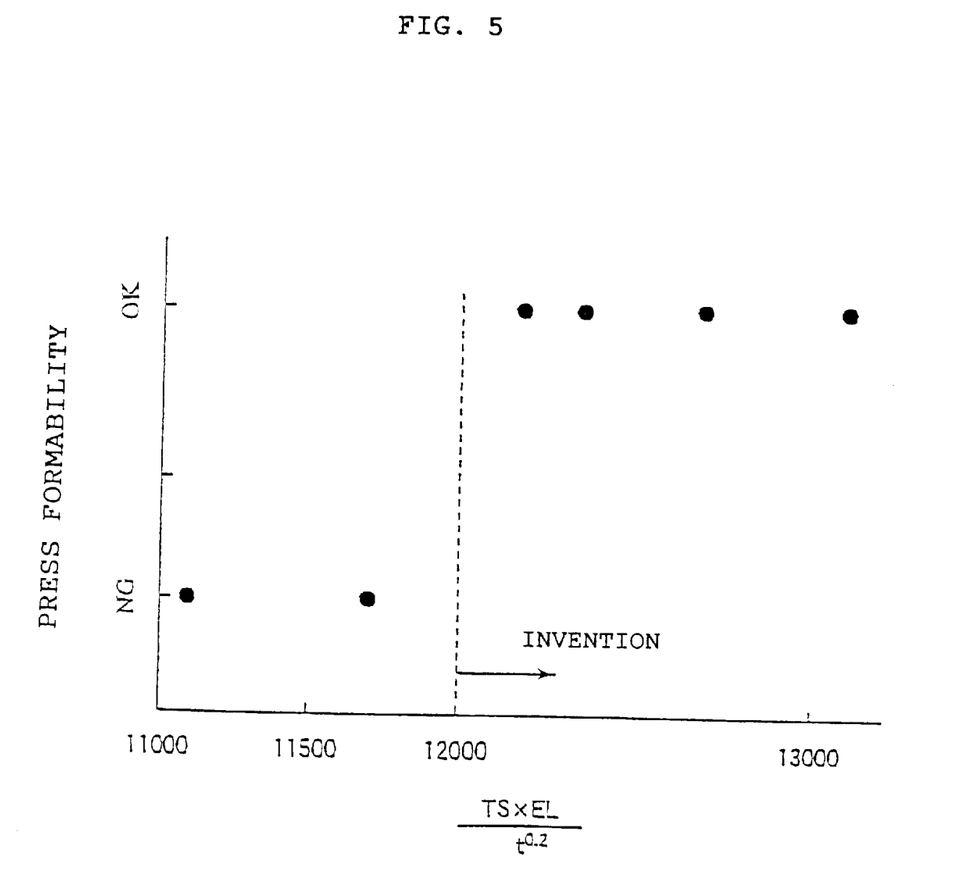
FIG. 5 is a graph showing the relationship between TS×EL/$t^{0.2}$ and press formability.

A suspension arm was fabricated with a 1200-ton press by using a hot rolled steel sheet that contains 0.04% C, 0.09% Ti, and 0.2% Mo and has a thickness of 3.5 to 2.7 mm and TS of 710 to 850 MPa. Then, the relationship between $(TS \times EL)/t^{0.2}$ and press formability (no cracking: OK, cracking: NG) was investigated.

As shown in FIG. 5, if $(TS \times EL)/t^{0.2}$ exceeds 12000, cracking does not occur at all.

EXAMPLE 1

Steels A to E having a chemical composition given in Table 1 were hot rolled under the conditions given in Table 1, by which steel sheets 1 to 5 were manufactured. Thereafter, a tensile test using a JIS No. 5 test piece was conducted, and also the investigation of structure and precipitate under a transmission electron microscope, the measurement of hole expanding ratio (λ), and the real press test of suspension arm were carried out by the above-described method. Table 1 additionally gives the structure of matrix, the grain size of precipitates, and the number per unit volume of precipitates.

The results are given in Table 2.

According to the observation under a transmission electron microscope, in the steel sheets 1 to 3 of examples of this invention, fine precipitates with a grain size of smaller than 10 nm were dispersed homogeneously in a matrix of ferrite structure single phase. Also, these fine precipitates were carbides containing Ti and Mo. The steel sheets 1 to 3 had TS of not lower than 800 MPa and high EL and λ, and were not cracked in the press test.

On the other hand, the steel sheet 4 of comparative example, having a bainite (B) structure, had low EL and was cracked in the press test. Also, the steel sheet 5, having a ferrite+pearlite (F+P) structure, had low λ and was cracked.

TABLE 1

| | | | | | | | | | | | | Hot rolling conditions | | | Fine precipitate | | |
|---|---|---|---|---|---|---|---|---|---|---|---|---|---|---|---|---|---|
| | | | | | | | | | | | | Finishing | Coiling | | | | |
| | Chemical composition (wt %) | | | | | | | | | | | temperature | temperature | Structure | Grain size | Number | |
| Steel | C | Si | Mn | P | S | Al | N | Ti | Nb | Mo | Cr | (° C.) | (° C.) | | (nm) | ($10^4/\mu m^3$) | Remarks |
| A | 0.045 | 0.05 | 1.67 | 0.004 | 0.001 | 0.044 | 0.0020 | 0.085 | 0.007 | 0.20 | 0.056 | 890 | 600 | F | 1 | 21 | Inventive example |
| B | 0.046 | 0.08 | 1.65 | 0.005 | 0.001 | 0.040 | 0.0025 | 0.084 | 0.008 | 0.19 | 0.056 | 900 | 625 | F | 2 | 21 | Inventive example |
| C | 0.044 | 0.08 | 1.59 | 0.006 | 0.001 | 0.041 | 0.0022 | 0.087 | 0.005 | 0.21 | 0.057 | 890 | 650 | F | 2 | 22 | Inventive example |
| D | 0.045 | 0.06 | 1.64 | 0.005 | 0.001 | 0.041 | 0.0020 | 0.088 | 0.006 | 0.21 | 0.058 | 900 | 480 | B | 1 | 4.0 | Comparative example |
| E | 0.122 | 0.46 | 1.84 | 0.011 | 0.001 | 0.046 | 0.0041 | 0.091 | 0.041 | — | 0.195 | 860 | 570 | F + P | 30 | 4.4 | Comparative example |

F: ferrite, B: bainite, P: pearlite

TABLE 2

| Steel sheet | Steel | Thickness (mm) | TS (MPa) | EL (%) | TS × EL | λ (%) | Press formability | Remarks |
|---|---|---|---|---|---|---|---|---|
| 1 | A | 3.2 | 821 | 21.1 | 17323 | 105 | OK | Inventive example |
| 2 | B | 3.2 | 810 | 23.1 | 18711 | 110 | OK | Inventive example |
| 3 | C | 3.2 | 815 | 22.3 | 18175 | 118 | OK | Inventive example |
| 4 | D | 3.2 | 841 | 16.5 | 13877 | 95 | NG | Comparative example |
| 5 | E | 3.2 | 856 | 20.7 | 17719 | 30 | NG | Comparative example |

EXAMPLE 2

Steels A to P having a chemical composition given in Table 3 were heated to a temperature of 1250° C. and then hot rolled at a finishing temperature of 880 to 930° C., by which steel sheets 1 to 16 with a thickness of 3.2 mm were manufactured by changing the cooling rate and the coiling temperature. Thereafter, the same tests as those in example 1 were conducted.

The results are given in Table 4.

The steel sheets 1 to 10 of examples of this invention, having a ferrite structure single phase, had precipitates with a grain size of smaller than 10 nm, a value of Mo/(Ti+Nb+V+Mo) of 0.25 or higher by atomic percentage, and TS of not lower than 550 MPa and high EL and λ. Also, according to the observation under an electron microscope, fine precipitates were dispersed homogeneously in the ferrite structure.

Contrarily, for the steel sheets 11 and 12 of comparative examples to which Mo was not added, pearlite was yielded, and precipitates were coarse, so that both EL and λ were low. Also, for the steel sheet 13, the grain size of precipitates was 10 nm or larger, and the C content was low and the amount of precipitates was small, so that TS was lower than 550 MPa. For the steel sheet 14, the Mn content was high and the segregation was remarkable, and also martensite was formed, so that both EL and λ were low. For the steel sheet 15, the Ti content was low and the amount of precipitates was small, so that TS was lower than 55 MPa. For the steel sheet 16, although the Ti content was high and composite precipitates of Ti and Mo existed, the ratio of Mo in the composite precipitates was low and the Si content was high, so that the precipitates were coarse, and thus both EL and λ were low.

EXAMPLE 3

Steels having a chemical composition given in Table 5 were heated to an austenite zone, then hot rolled at a finishing temperature of 880° C., and coiled at a coiling temperature given in Table 5, by which steel sheets 17 to 29 with a thickness given in Table 5 were manufactured. The steel sheets 17 to 23 are ones manufactured with the aim of providing TS of not lower than 780 MPa, and the steel sheets 24 to 29 are ones manufactured with the aim of providing TS of not lower than 590 MPa. A tensile test was conducted by using a JIS No. 5 test piece. Also, the sheet shape after rolling was judged visually. A flat sheet was indicated by

TABLE 3

| Steel | Chemical composition (wt %) | | | | | | | | | | | |
|---|---|---|---|---|---|---|---|---|---|---|---|---|
| | C | Si | Mn | P | S | Al | N | Mo | Ti | Nb | V | Others |
| A | 0.045 | 0.20 | 1.60 | 0.003 | 0.0007 | 0.046 | 0.0041 | 0.20 | 0.085 | — | — | — |
| B | 0.047 | 0.22 | 1.59 | 0.002 | 0.0006 | 0.048 | 0.0040 | 0.20 | 0.082 | 0.012 | — | — |
| C | 0.042 | 0.18 | 1.56 | 0.004 | 0.0006 | 0.052 | 0.0040 | 0.11 | 0.080 | 0.037 | — | — |
| D | 0.045 | 0.18 | 1.39 | 0.006 | 0.0006 | 0.049 | 0.0031 | 0.21 | 0.084 | 0.008 | — | — |
| E | 0.035 | 0.09 | 1.65 | 0.005 | 0.0009 | 0.050 | 0.0045 | 0.30 | 0.040 | 0.011 | 0.069 | — |
| F | 0.038 | 0.11 | 1.12 | 0.004 | 0.0008 | 0.046 | 0.0043 | 0.15 | 0.043 | 0.009 | — | — |
| G | 0.040 | 0.08 | 0.89 | 0.005 | 0.0007 | 0.045 | 0.0042 | 0.14 | 0.025 | 0.041 | — | — |
| H | 0.043 | 0.17 | 1.56 | 0.005 | 0.0008 | 0.046 | 0.0039 | 0.19 | 0.083 | 0.010 | — | Cr: 0.12 |
| I | 0.042 | 0.16 | 1.57 | 0.004 | 0.0008 | 0.047 | 0.0041 | 0.20 | 0.082 | 0.007 | — | Cu: 0.14 |
| J | 0.042 | 0.18 | 1.55 | 0.004 | 0.0006 | 0.049 | 0.0039 | 0.20 | 0.085 | 0.008 | — | Ni: 0.11 |
| K | 0.063 | 0.20 | 1.72 | 0.008 | 0.0006 | 0.054 | 0.0028 | — | 0.084 | 0.040 | — | — |
| L | 0.051 | 0.09 | 1.70 | 0.006 | 0.0009 | 0.048 | 0.0040 | — | 0.101 | 0.038 | — | — |
| M | 0.006 | 0.16 | 1.61 | 0.005 | 0.0010 | 0.046 | 0.0042 | 0.13 | 0.070 | 0.011 | — | — |
| N | 0.045 | 0.15 | 2.20 | 0.004 | 0.0008 | 0.050 | 0.0045 | 0.15 | 0.061 | 0.022 | — | — |
| O | 0.047 | 0.19 | 1.54 | 0.005 | 0.0009 | 0.045 | 0.0038 | 0.12 | 0.010 | 0.012 | — | — |
| P | 0.050 | 0.48 | 1.03 | 0.012 | 0.0010 | 0.030 | 0.0025 | 0.21 | 0.150 | 0.050 | — | — |

TABLE 4

| Steel sheet | Steel | TS (MPa) | EL (%) | λ (%) | Structure | Precipitate grain size (nm) | Precipitate composition ratio Mo/(Ti + Nb + V + Mo) | Remarks |
|---|---|---|---|---|---|---|---|---|
| 1 | A | 806 | 24.6 | 109 | F | 3 | 0.47 | Inventive example |
| 2 | B | 807 | 24.4 | 111 | F | 3 | 0.46 | Inventive example |
| 3 | C | 795 | 23.3 | 83 | F | 4 | 0.39 | Inventive example |
| 4 | D | 793 | 24.9 | 108 | F | 4 | 0.48 | Inventive example |
| 5 | E | 789 | 24.7 | 101 | F | 3 | 0.28 | Inventive example |
| 6 | F | 603 | 33.9 | 133 | F | 4 | 0.67 | Inventive example |
| 7 | G | 598 | 34.1 | 138 | F | 4 | 0.75 | Inventive example |
| 8 | H | 803 | 24.0 | 108 | F | 3 | 0.46 | Inventive example |
| 9 | I | 801 | 24.7 | 100 | F | 3 | 0.47 | Inventive example |
| 10 | J | 805 | 24.5 | 107 | F | 3 | 0.47 | Inventive example |
| 11 | K | 811 | 20.5 | 39 | F + P | 16 | 0 | Comparative example |
| 12 | L | 786 | 20.7 | 46 | F | 15 | 0 | Comparative example |
| 13 | M | 495 | 36.7 | 121 | F | 11 | 0.51 | Comparative example |
| 14 | N | 802 | 19.3 | 43 | F + M | 5 | 0.49 | Comparative example |
| 15 | O | 508 | 37.1 | 125 | F | 6 | 0.83 | Comparative example |
| 16 | P | 801 | 20.4 | 78 | F | 12 | 0.01 | Comparative example | mark ◯, and a remarkably wavy sheet was indicated by mark X. Further, precipitates were investigated under a transmission electron microscope.

For the steel sheets 17 to 21 and 24 to 27 of examples of this invention, the value of Mo/(Ti+Nb+Mo) was 0.25 or higher, high TS and EL were obtained, and the sheet shape was good.

On the other hand, for the steel sheets 22, 23, 28 and 29 of comparative examples, the value of Mo/(Ti+Nb+Mo) was lower than 0.25, EL was low, and the sheet shape was remarkably wavy. The reason for this is that quenching was performed after hot rolling to secure strength, so that a second phase was formed.

for the steel sheets 2 and 3 in which the value of (Si+Mo) is 0.5 or lower, a very good surface property was obtained. For the steel sheet 3, according to the investigation under a transmission electron microscope, fine carbides containing Ti and Mo were dispersed homogeneously in the ferrite structure.

Contrarily, for the steel sheet 1 of comparative example to which Mo was not added, the structure was a ferrite+pearlite structure, and the variation in properties in the width direction ΔTS was 30 MPa or larger, and also ΔEL was as large as 2% or larger. Also, for the steel sheet 5 of comparative example in which much Mo was added and Ti/Mo is less than 0.1, the variation in properties was small, but the elongation decreases greatly.

TABLE 5

| Steel sheet | Chemical composition (wt %) | | | | | | | | | | Precipitate composition ratio Mo/(Ti + Nb + V + Mo) | Thickness (mm) | Coiling temperature (° C.) | TS (MPa) | EL (%) | Shape | Remarks |
|---|---|---|---|---|---|---|---|---|---|---|---|---|---|---|---|---|---|
| | C | Si | Mn | P | S | Al | N | Mo | Ti | Nb | | | | | | | |
| 17 | 0.055 | 0.12 | 1.81 | 0.005 | 0.001 | 0.045 | 0.0025 | 0.22 | 0.088 | 0.010 | 0.48 | 2.0 | 625 | 801 | 20.1 | ◯ | Inventive example |
| 18 | ditto | ditto | ditto | ditto | ditto | ditto | ditto | ditto | ditto | ditto | 0.48 | 1.6 | 625 | 810 | 19.2 | ◯ | Inventive example |
| 19 | ditto | ditto | ditto | ditto | ditto | ditto | ditto | ditto | ditto | ditto | 0.48 | 1.4 | 625 | 805 | 18.6 | ◯ | Inventive example |
| 20 | ditto | ditto | ditto | ditto | ditto | ditto | ditto | ditto | ditto | ditto | 0.48 | 1.2 | 625 | 807 | 18.1 | ◯ | Inventive example |
| 21 | ditto | ditto | ditto | ditto | ditto | ditto | ditto | ditto | ditto | ditto | 0.45 | 2.0 | 600 | 795 | 18.9 | ◯ | Inventive example |
| 22 | ditto | ditto | ditto | ditto | ditto | ditto | ditto | ditto | ditto | ditto | 0.20 | 2.0 | 540 | 821 | 16.3 | X | Comparative example |
| 23 | ditto | ditto | ditto | ditto | ditto | ditto | ditto | ditto | ditto | ditto | 0.16 | 2.0 | 500 | 830 | 14.1 | X | Comparative example |
| 24 | 0.020 | 0.01 | 1.31 | 0.001 | 0.001 | 0.050 | 0.0034 | 0.18 | 0.051 | 0.020 | 0.53 | 2.3 | 640 | 605 | 35.1 | ◯ | Inventive example |
| 25 | ditto | ditto | ditto | ditto | ditto | ditto | ditto | ditto | ditto | ditto | 0.53 | 1.8 | 640 | 610 | 33.4 | ◯ | Inventive example |
| 26 | ditto | ditto | ditto | ditto | ditto | ditto | ditto | ditto | ditto | ditto | 0.53 | 1.4 | 640 | 608 | 31.8 | ◯ | Inventive example |
| 27 | ditto | ditto | ditto | ditto | ditto | ditto | ditto | ditto | ditto | ditto | 0.53 | 1.2 | 640 | 611 | 30.8 | ◯ | Inventive example |
| 28 | ditto | ditto | ditto | ditto | ditto | ditto | ditto | ditto | ditto | ditto | 0.22 | 1.4 | 540 | 631 | 28.1 | X | Comparative example |
| 29 | ditto | ditto | ditto | ditto | ditto | ditto | ditto | ditto | ditto | ditto | 0.18 | 1.4 | 510 | 642 | 25.3 | X | Comparative example |

EXAMPLE 4

Steels having a chemical composition given in Table 6 were heated to a temperature of 1250° C., then hot rolled at a finishing temperature of 890° C., and coiled at a coiling temperature of 650° C., by which steel sheets with a thickness of 3.2 mm were manufactured. A tensile test was conducted by taking JIS No. 5 test pieces from a central position in the width direction and a position 65 mm distant from the edge in the central portion in the longitudinal direction of the steel sheet. Also, precipitates were investigated under a transmission electron microscope. Further, a scale defect caused by Si was evaluated by the above-described method.

The results are given in Table 6.

For the steel sheets 2 to 4 of examples of this invention, homogeneous properties were obtained in the width direction, and the surface property was good. In particular, For the steel sheets 7 to 9 of examples of this invention, the variation in properties in the width direction was small, and the surface property was very good.

Contrarily, for the steel sheet 6 of comparative example to which Mo was not added, the structure was a ferrite+pearlite structure, and the variation in properties ΔTS was 30 MPa or larger, and also ΔEL was as large as 2% or larger. For the steel sheet 10 of comparative example to which much Cr was added, the formation of second phase could not be restrained, and the structure was an acicular ferrite structure, so that EL decreases significantly. For all of these steel sheets, since the value of (Si+Mo) was 0.5% or lower, the surface property was very good.

For the steel sheets 12 to 14 of examples of this invention, the variation in properties in the width direction was small, and the surface property was also good.

Contrarily, for the steel sheet 11 of comparative example to which Ti was not added, pearlite and cementite were precipitated, and although TS is low, EL is as low as that of the steel sheet 12, and the variation in properties was also large.

For the steel sheets 16 to 18 of examples of this invention, the variation in properties in the width direction was small, and the surface property was good. In particular, for the steel sheet 16 in which the value of (Si+Mo) was 0.5% or lower, the surface property was very good.

Contrarily, for the steel sheet 15 of comparative example to which Mo was not added, the variation in properties was large, and, for the steel sheet 19 of comparative example to which much Mo was added, EL was low.

characteristic values were investigated in the central and edge portions in the width direction of steel sheet. Also, precipitates were investigated under a transmission electron microscope.

The results are given in Table 7.

For the steel sheets 21 to 25 in which the finishing temperature was changed, the variation in properties was very small when the finishing temperature was 880° C. or higher.

TABLE 6

| Steel sheet | C | Si | Mn | P | S | Al | N | Mo | Ti | Nb | Cr | Structure | Ti/Mo | TS (MPa) | EL (%) | Δ TS | Δ EL | Surface property | Remarks |
|---|---|---|---|---|---|---|---|---|---|---|---|---|---|---|---|---|---|---|---|
| 1 | 0.040 | 0.18 | 1.62 | 0.005 | 0.002 | 0.050 | 0.0030 | — | 0.084 | 0.011 | 0.056 | F + P | — | 781 | 19.8 | 45 | 2.4 | ◎ | Comparative example |
| 2 | 0.041 | 0.18 | 1.60 | 0.006 | 0.003 | 0.055 | 0.0033 | 0.11 | 0.080 | 0.010 | 0.051 | F | 1.53 | 816 | 21.4 | 15 | 0.5 | ◎ | Inventive example |
| 3 | 0.043 | 0.19 | 1.61 | 0.006 | 0.003 | 0.054 | 0.0028 | 0.20 | 0.085 | 0.010 | 0.056 | F | 0.82 | 807 | 24.4 | 12 | 0.1 | ◎ | Inventive example |
| 4 | 0.044 | 0.17 | 1.59 | 0.003 | 0.003 | 0.048 | 0.0025 | 0.36 | 0.084 | 0.012 | 0.050 | F | 0.61 | 812 | 24.2 | 11 | 0.2 | ○ | Inventive example |
| 5 | 0.044 | 0.17 | 1.63 | 0.006 | 0.003 | 0.057 | 0.0036 | 0.72 | 0.085 | 0.011 | 0.055 | AF | 0.05 | 890 | 14.9 | 10 | 0.1 | X | Comparative example |
| 6 | 0.035 | 0.15 | 1.61 | 0.012 | 0.003 | 0.035 | 0.0016 | — | 0.040 | 0.011 | 0.230 | F + P | — | 572 | 36.8 | 43 | 2.3 | ◎ | Comparative example |
| 7 | 0.035 | 0.15 | 1.45 | 0.011 | 0.003 | 0.036 | 0.0018 | 0.23 | 0.040 | 0.013 | 0.081 | F | 0.46 | 610 | 35.6 | 12 | 0.2 | ◎ | Inventive example |
| 8 | 0.036 | 0.14 | 1.43 | 0.013 | 0.002 | 0.037 | 0.0019 | 0.19 | 0.041 | 0.014 | 0.151 | F | 0.44 | 615 | 34.6 | 12 | 0.3 | ◎ | Inventive example |
| 9 | 0.036 | 0.13 | 1.44 | 0.011 | 0.003 | 0.031 | 0.0018 | 0.20 | 0.043 | 0.013 | 0.425 | F | 0.45 | 624 | 35.5 | 9 | 0.1 | ◎ | Inventive example |
| 10 | 0.035 | 0.14 | 1.46 | 0.014 | 0.004 | 0.035 | 0.0019 | 0.22 | 0.042 | 0.014 | 0.740 | AF | 0.48 | 687 | 28.9 | 9 | 0.2 | ◎ | Comparative example |
| 11 | 0.056 | 0.26 | 1.30 | 0.009 | 0.003 | 0.061 | 0.0039 | 0.34 | — | 0.034 | 0.240 | F + P | 0 | 512 | 34.1 | 48 | 4.3 | ○ | Comparative example |
| 12 | 0.057 | 0.27 | 1.40 | 0.008 | 0.002 | 0.060 | 0.0038 | 0.35 | 0.030 | 0.034 | 0.260 | F | 0.23 | 623 | 34.3 | 8 | 0.9 | ○ | Inventive example |
| 13 | 0.058 | 0.26 | 1.36 | 0.009 | 0.003 | 0.069 | 0.0041 | 0.46 | 0.057 | 0.035 | 0.260 | F | 0.25 | 781 | 24.9 | 9 | 1.1 | ○ | Inventive example |
| 14 | 0.054 | 0.26 | 1.38 | 0.007 | 0.002 | 0.068 | 0.0037 | 0.35 | 0.089 | 0.034 | 0.240 | F | 0.51 | 812 | 24.1 | 11 | 1.3 | ○ | Inventive example |
| 15 | 0.045 | 0.38 | 1.39 | 0.011 | 0.003 | 0.050 | 0.0031 | — | 0.085 | 0.041 | 0.154 | F + P | — | 735 | 22.4 | 53 | 4.2 | ○ | Comparative example |
| 16 | 0.044 | 0.39 | 1.38 | 0.008 | 0.004 | 0.049 | 0.0030 | 0.08 | 0.084 | 0.043 | 0.162 | F | 2.10 | 782 | 24.1 | 12 | 1.3 | ◎ | Inventive example |
| 17 | 0.046 | 0.37 | 1.39 | 0.010 | 0.003 | 0.045 | 0.0029 | 0.23 | 0.085 | 0.041 | 0.158 | F | 0.74 | 791 | 23.3 | 13 | 1.2 | ○ | Inventive example |
| 18 | 0.044 | 0.28 | 1.38 | 0.011 | 0.001 | 0.043 | 0.0033 | 0.31 | 0.086 | 0.045 | 0.187 | F | 0.49 | 829 | 22.2 | 11 | 0.7 | ○ | Inventive example |
| 19 | 0.044 | 0.37 | 1.37 | 0.009 | 0.002 | 0.048 | 0.0031 | 0.77 | 0.084 | 0.042 | 0.177 | AF | 0.22 | 898 | 17.4 | 10 | 1.2 | X | Comparative example |

F: ferrite, AF: acicular ferrite, P: pearlite

EXAMPLE 5

Steels having a chemical composition given in Table 7 were hot rolled under the conditions given in Table 7, by which steel sheets 21 to 38 with a thickness of 3.6 mm were manufactured. As in the case of example 4, the tensile characteristic values were investigated in the central and Also, for the steel sheets 26 to 30 in which the coiling temperature was changed, the variation in properties of the steel sheets 27 to 29 in which the coiling temperature was 550 to 700° C. was very small, and the elongation thereof was also high.

Contrarily, for the steel sheets 26 and 30 whose coiling temperature is out of the range of 550 to 700° C., the variation in properties was large.

For the steel sheets 31 to 35 in which the finishing temperature and coiling temperature were changed, the variation in properties of the steel sheets 32 to 34 in which the finishing temperature was 880° C. or higher and the coiling temperature was 550 to 700° C. was very small.

For the steel sheets 36 and 37, the Mo content was high, the ratio of Ti/Mo of precipitates was lower than 0.1, and the variation in properties was large. Also, for the steel sheet 38, the coiling temperature was as low as 500° C., a bainite structure was formed, and the variation in TS was especially large.

MPa or higher, EL of 20% or higher, and λ of 70% or higher was judged to be good.

The results are given in Table 9.

For the steel sheets 1 to 3 and 5 to 15 of examples of this invention, the chemical composition was within the range of the present invention, and the structure was a ferrite structure in which carbides containing Ti and Mo were dispersed homogeneously, so that EL and λ were high.

Contrarily, for the steel sheet 4 of comparative example, a bainite structure with high dislocation density was formed because of the low coiling temperature, so that EL was low. For the steel sheets 16 to 18 of comparative examples, pearlite or martensite was formed, so that both EL and λ were low. Also, for the steel sheet 19, carbides and nitrides

TABLE 7

| Steel sheet | Chemical composition (wt %) | | | | | | | | | | | Hot rolling conditions | | Structure | Ti/Mo | Tensile properties | | Variation in properties | |
| | C | Si | Mn | P | S | Al | N | Mo | Ti | Nb | Cr | Finishing temperature (° C.) | Coiling temperature (° C.) | | | TS (MPa) | EL (%) | ΔTS | ΔEL |
| --- | --- | --- | --- | --- | --- | --- | --- | --- | --- | --- | --- | --- | --- | --- | --- | --- | --- | --- | --- |
| 21 | 0.042 | 0.18 | 1.54 | 0.001 | 0.001 | 0.055 | 0.0029 | 0.21 | 0.085 | 0.008 | 0.060 | 865 | 603 | F | 1.30 | 703 | 21.2 | 28 | 1.2 |
| 22 | ditto | ditto | ditto | ditto | ditto | ditto | ditto | ditto | ditto | ditto | ditto | 880 | 604 | F | 1.32 | 819 | 20.5 | 15 | 0.4 |
| 23 | ditto | ditto | ditto | ditto | ditto | ditto | ditto | ditto | ditto | ditto | ditto | 885 | 604 | F | 1.41 | 825 | 20.6 | 10 | 0.3 |
| 24 | ditto | ditto | ditto | ditto | ditto | ditto | ditto | ditto | ditto | ditto | ditto | 910 | 610 | F | 1.30 | 820 | 21.3 | 8 | 0.2 |
| 25 | ditto | ditto | ditto | ditto | ditto | ditto | ditto | ditto | ditto | ditto | ditto | 920 | 606 | F | 1.32 | 823 | 21.1 | 10 | 0.2 |
| 26 | 0.045 | 0.17 | 1.39 | 0.006 | 0.001 | 0.049 | 0.0031 | 0.22 | 0.088 | 0.009 | 0.067 | 892 | 500 | AF | 0.03 | 764 | 20.6 | 31 | 1.7 |
| 27 | ditto | ditto | ditto | ditto | ditto | ditto | ditto | ditto | ditto | ditto | ditto | 891 | 580 | F | 2.30 | 821 | 23.8 | 10 | 0.2 |
| 28 | ditto | ditto | ditto | ditto | ditto | ditto | ditto | ditto | ditto | ditto | ditto | 890 | 630 | F | 1.20 | 831 | 24.3 | 5 | 0.2 |
| 29 | ditto | ditto | ditto | ditto | ditto | ditto | ditto | ditto | ditto | ditto | ditto | 893 | 650 | F | 1.10 | 824 | 24.4 | 3 | 0.1 |
| 30 | ditto | ditto | ditto | ditto | ditto | ditto | ditto | ditto | ditto | ditto | ditto | 894 | 720 | F + P | 1.10 | 703 | 20.3 | 25 | 1.9 |
| 31 | 0.035 | 0.25 | 1.55 | 0.005 | 0.001 | 0.034 | 0.0022 | 0.15 | 0.035 | 0.015 | 0.080 | 843 | 592 | F | 0.61 | 544 | 31.1 | 24 | 1.6 |
| 32 | ditto | ditto | ditto | ditto | ditto | ditto | ditto | ditto | ditto | ditto | ditto | 892 | 623 | F | 0.65 | 620 | 35.0 | 5 | 0.3 |
| 33 | ditto | ditto | ditto | ditto | ditto | ditto | ditto | ditto | ditto | ditto | ditto | 899 | 632 | F | 0.67 | 613 | 35.4 | 6 | 0.2 |
| 34 | ditto | ditto | ditto | ditto | ditto | ditto | ditto | ditto | ditto | ditto | ditto | 891 | 600 | F | 0.61 | 611 | 34.4 | 4 | 0.2 |
| 35 | ditto | ditto | ditto | ditto | ditto | ditto | ditto | ditto | ditto | ditto | ditto | 901 | 490 | BF | 0.03 | 531 | 27.5 | 22 | 1.7 |
| 36 | 0.05 | 0.50 | 1.50 | 0.01 | 0.001 | 0.035 | 0.0025 | 0.99 | 0.150 | 0.050 | — | 895 | 590 | F | 0.08 | 635 | 26.3 | 26 | 2.3 |
| 37 | ditto | ditto | ditto | ditto | ditto | ditto | ditto | ditto | ditto | ditto | ditto | 903 | 700 | F + P | 0.08 | 725 | 22.3 | 35 | 3.1 |
| 38 | 0.05 | 0.48 | 1.03 | 0.012 | 0.001 | 0.030 | 0.0025 | 0.21 | 0.150 | 0.050 | — | 910 | 500 | B | 0.08 | 815 | 18.2 | 42 | 2.9 |

F: ferrite, AF: acicular ferrite, P: pearlite, B: bainite, BF: bainitic ferrite

EXAMPLE 6

Steels A to T having a chemical composition given in Table 8 were hot rolled under the hot rolling conditions given in Table 9, by which steel sheets 1 to 23 with a thickness of 3.2 mm were manufactured. Thereafter, a tensile test and a hole expanding test were conducted. Also, a metallographic structure was observed under an optical microscope and a scanning electron microscope. Further, precipitates were investigated under a transmission electron microscope. In this example, a steel sheet having TS of 780 of Ti and Nb were not fine because a small amount of Mo was added, and few Mo carbides were precipitated, so that λ was low. For the steel sheet 21, a small amount of Ti was added and the amount of Ti carbides was small, so that TS and λ were low. For the steel sheets 22 and 23, since Mo was not added and much Ti was added, the precipitates were coarse and the thereof was excessive, so that both El and λ were low.

TABLE 8

| Steel | Chemical composition (wt %) | | | | | | | | | | |
| | C | Si | Mn | P | S | Al | N | Mo | Ti | Nb | Cr |
| --- | --- | --- | --- | --- | --- | --- | --- | --- | --- | --- | --- |
| A | 0.043 | 0.20 | 1.61 | 0.005 | 0.0010 | 0.054 | 0.0028 | 0.20 | 0.085 | 0.008 | 0.056 |
| B | 0.042 | 0.18 | 1.56 | 0.004 | 0.0006 | 0.052 | 0.0040 | 0.10 | 0.080 | 0.037 | 0.082 |
| C | 0.045 | 0.18 | 1.39 | 0.006 | 0.0006 | 0.049 | 0.0031 | 0.21 | 0.084 | 0.008 | 0.067 |
| D | 0.057 | 0.19 | 1.59 | 0.005 | 0.0015 | 0.050 | 0.0034 | 0.18 | 0.076 | 0.010 | 0.710 |

TABLE 8-continued

| | Chemical composition (wt %) | | | | | | | | | |
|---|---|---|---|---|---|---|---|---|---|---|
| Steel | C | Si | Mn | P | S | Al | N | Mo | Ti | Nb | Cr |
| E | 0.047 | 0.28 | 1.63 | 0.008 | 0.0011 | 0.048 | 0.0046 | 0.19 | 0.082 | 0.012 | — |
| F | 0.043 | 0.18 | 1.91 | 0.012 | 0.0015 | 0.046 | 0.0051 | 0.21 | 0.066 | 0.011 | 0.094 |
| G | 0.045 | 0.20 | 1.50 | 0.014 | 0.0016 | 0.044 | 0.0044 | 0.12 | 0.084 | 0.013 | 0.081 |
| H | 0.048 | 0.07 | 1.41 | 0.009 | 0.0009 | 0.050 | 0.0049 | 0.38 | 0.077 | 0.009 | — |
| I | 0.045 | 0.10 | 1.40 | 0.011 | 0.0018 | 0.049 | 0.0031 | 0.20 | 0.033 | 0.040 | — |
| J | 0.048 | 0.14 | 1.60 | 0.008 | 0.0011 | 0.048 | 0.0035 | 0.20 | 0.096 | 0.043 | 0.070 |
| K | 0.040 | 0.11 | 1.36 | 0.009 | 0.0014 | 0.039 | 0.0040 | 0.18 | 0.079 | 0.009 | 0.081 |
| L | 0.050 | 0.12 | 1.62 | 0.005 | 0.0008 | 0.041 | 0.0039 | 0.43 | 0.088 | 0.010 | — |
| M | 0.066 | 0.20 | 1.50 | 0.002 | 0.0006 | 0.051 | 0.0039 | — | 0.166 | 0.057 | — |
| N | 0.065 | 0.18 | 1.72 | 0.006 | 0.0008 | 0.050 | 0.0034 | 0.20 | 0.080 | 0.010 | 0.061 |
| O | 0.041 | 0.21 | 2.20 | 0.008 | 0.0013 | 0.036 | 0.0035 | 0.15 | 0.081 | 0.008 | 0.070 |
| P | 0.043 | 0.19 | 1.60 | 0.008 | 0.0009 | 0.038 | 0.0028 | 0.04 | 0.078 | 0.009 | 0.053 |
| Q | 0.050 | 0.20 | 1.20 | 0.006 | 0.0011 | 0.041 | 0.0033 | 0.49 | 0.068 | 0.008 | — |
| R | 0.046 | 0.18 | 1.64 | 0.012 | 0.0013 | 0.032 | 0.0028 | 0.16 | 0.016 | 0.051 | 0.051 |
| S | 0.040 | 0.51 | 1.51 | 0.012 | 0.0012 | 0.030 | 0.0026 | — | 0.250 | — | — |
| T | 0.030 | 0.51 | 1.48 | 0.010 | 0.0012 | 0.035 | 0.0026 | — | 0.151 | 0.013 | — |

TABLE 9

| Steel sheet | Steel | Heating temperature (° C.) | Finishing temperature (° C.) | Coiling temperature (° C.) | TS (MPa) | EL (%) | λ (%) | Structure | Remarks |
|---|---|---|---|---|---|---|---|---|---|
| 1 | A | 1250 | 910 | 560 | 782 | 20.2 | 85 | F | Inventive example |
| 2 | A | 1200 | 880 | 600 | 820 | 21.4 | 86 | F | Inventive example |
| 3 | A | 1250 | 900 | 675 | 813 | 24.1 | 113 | F | Inventive example |
| 4 | A | 1200 | 880 | 510 | 740 | 17.2 | 91 | B | Comparative example |
| 5 | B | 1250 | 900 | 640 | 798 | 23.6 | 81 | F | Inventive example |
| 6 | C | 1250 | 915 | 650 | 831 | 24.2 | 85 | F | Inventive example |
| 7 | D | 1200 | 880 | 610 | 799 | 22.1 | 73 | F | Inventive example |
| 8 | E | 1250 | 900 | 640 | 822 | 22.6 | 80 | F | Inventive example |
| 9 | F | 1250 | 890 | 630 | 836 | 20.6 | 82 | F | Inventive example |
| 10 | G | 1200 | 900 | 600 | 783 | 24.9 | 89 | F | Inventive example |
| 11 | H | 1250 | 915 | 590 | 828 | 21.6 | 81 | F | Inventive example |
| 12 | I | 1250 | 890 | 620 | 780 | 23.1 | 90 | F | Inventive example |
| 13 | J | 1200 | 900 | 600 | 857 | 20.1 | 79 | F | Inventive example |
| 14 | K | 1200 | 900 | 610 | 850 | 20.2 | 78 | F | Inventive example |
| 15 | L | 1250 | 900 | 450 | 811 | 23.1 | 100 | F | Inventive example |
| 16 | M | 1250 | 915 | 650 | 820 | 18.6 | 43 | F + P | Comparative example |
| 17 | N | 1200 | 900 | 710 | 830 | 18.1 | 52 | F + P | Comparative example |
| 18 | O | 1250 | 900 | 500 | 841 | 17.2 | 50 | F + M | Comparative example |
| 19 | P | 1250 | 890 | 580 | 791 | 20.4 | 55 | F | Comparative example |
| 20 | Q | 1250 | 900 | 510 | 820 | 17.9 | 46 | F + M | Comparative example |
| 21 | R | 1250 | 915 | 630 | 760 | 20.1 | 50 | F | Comparative example |
| 22 | S | 1250 | 900 | 600 | 830 | 17.4 | 39 | F | Comparative example |
| 23 | T | 1200 | 890 | 610 | 814 | 17.8 | 48 | F | Comparative example |

F. ferrite, B: bainite, M: martensite, P: pearlite

EXAMPLE 7

The steels A, F and M given in Table 8 were heated at a temperature of 1250° C., then hot rolled at a finishing temperature of 890° C., and coiled at a coiling temperature of 630° C., by which steel sheets with a thickness of 3.0 mm were manufactured. Also, the content of solid solution C was measured by the internal friction measurement.

Figure 6:
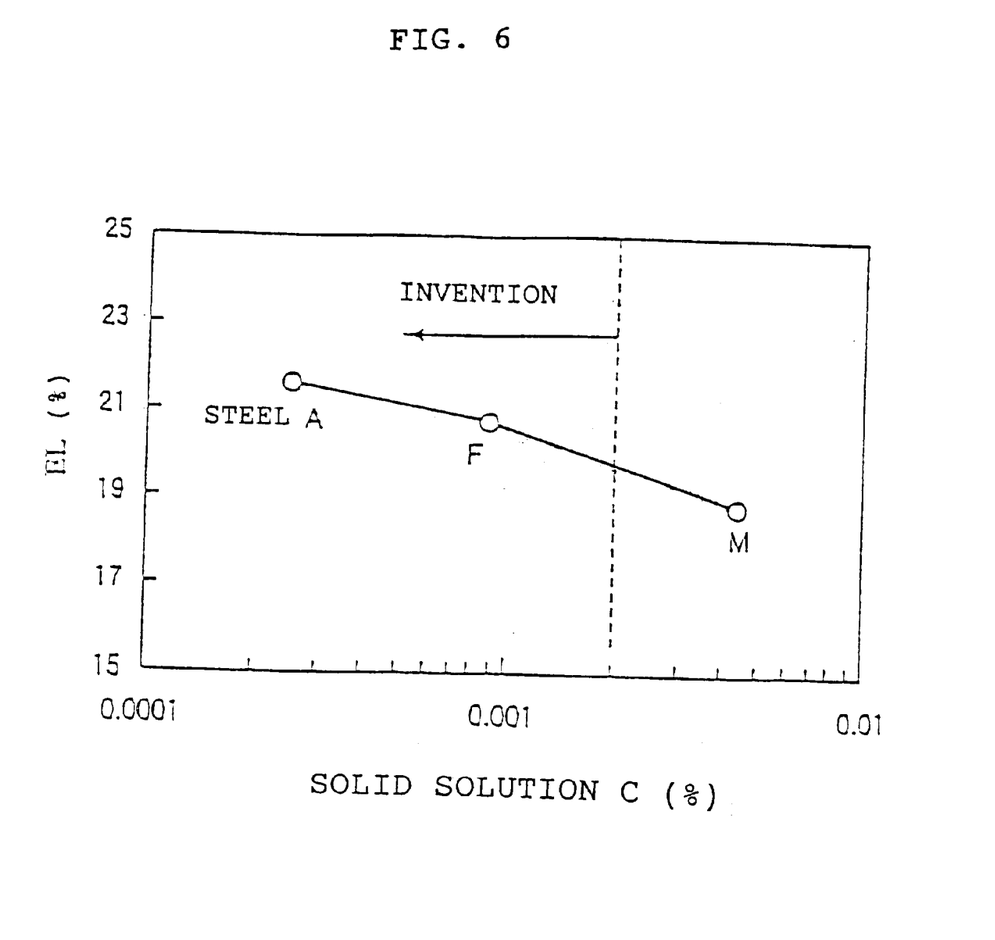
FIG. 6 is a graph showing the relationship between solid solution C content and EL.

FIG. 6 shows the relationship between solid solution C content and EL.

It was verified that if the solid solution C content is 0.0020% or lower, EL is high.

EXAMPLE 8

Steels A to M having a chemical composition given in Table 10 were heated at a temperature of 1250° C., then hot rolled at a finishing temperature of 880 to 930° C., by which steel sheets 1 to 13 with a thickness of 2.6 mm were manufactured by changing the cooling rate and coiling temperature. The coiling temperature was changed in the temperature range exceeding 600° C. Thereafter, a tensile test and a hole expanding test were conducted. Also, precipitates were investigated under a transmission electron microscope.

The results are given in Table 11.

For the steel sheets 1 to 9 of examples of this invention, the structure consisted of a ferrite structure single phase, the average grain size of precipitates was smaller than 10 nm, and the composition ratio of precipitates satisfied the equation of $0.1 \leq Ti/Mo \leq 3$, so that TS was not lower than 950 MPa, and EL and $\lambda$ were high.

Contrarily, for the steel sheet 10 of comparative example, the C content was too high, pearlite was formed because of no addition of Mo, and the precipitates were coarse, so that both EL and $\lambda$ were low. Also, for the steel sheet 11, the precipitates were coarse because of no addition of Mo, so that both EL and $\lambda$ were low. For the steel sheet 12, the segregation was remarkable because the content of Mn is too high, and martensite was formed, so that both EL and $\lambda$ were low. For the steel sheet 13, although composite precipitates of Ti and Mo existed, the content of C was too high, pearlite was formed, and the precipitates were coarse, so that both EL and $\lambda$ were low.

TABLE 10

| | Chemical composition (wt %) | | | | | | | | | | | |
|---|---|---|---|---|---|---|---|---|---|---|---|---|
| Steel | C | Si | Mn | P | S | Al | N | Mo | Ti | Nb | V | Others |
| A | 0.075 | 0.19 | 1.59 | 0.002 | 0.0007 | 0.045 | 0.0040 | 0.34 | 0.17 | — | — | — |
| B | 0.085 | 0.21 | 1.60 | 0.003 | 0.0008 | 0.046 | 0.0039 | 0.37 | 0.19 | 0.011 | — | — |
| C | 0.090 | 0.16 | 1.57 | 0.004 | 0.0007 | 0.050 | 0.0041 | 0.50 | 0.19 | 0.033 | — | — |
| D | 0.119 | 0.17 | 1.59 | 0.005 | 0.0006 | 0.048 | 0.0032 | 0.51 | 0.24 | 0.009 | — | — |
| E | 0.130 | 0.08 | 1.65 | 0.004 | 0.0009 | 0.044 | 0.0036 | 0.60 | 0.17 | 0.012 | 0.068 | — |
| F | 0.089 | 0.09 | 0.84 | 0.005 | 0.0007 | 0.047 | 0.0041 | 0.52 | 0.18 | 0.039 | — | — |
| G | 0.094 | 0.16 | 1.54 | 0.006 | 0.0007 | 0.045 | 0.0039 | 0.41 | 0.19 | 0.011 | — | Cr: 0.10 |
| H | 0.090 | 0.15 | 1.58 | 0.004 | 0.0007 | 0.044 | 0.0042 | 0.38 | 0.19 | 0.007 | — | Cu: 0.15 |
| I | 0.094 | 0.16 | 1.56 | 0.003 | 0.0006 | 0.046 | 0.0039 | 0.40 | 0.19 | 0.007 | — | Ni: 0.12 |
| J | 0.181 | 0.19 | 1.70 | 0.008 | 0.0007 | 0.051 | 0.0030 | — | 0.21 | 0.037 | — | — |
| K | 0.090 | 0.07 | 1.71 | 0.007 | 0.0009 | 0.047 | 0.0037 | — | 0.27 | 0.036 | — | — |
| L | 0.091 | 0.13 | 2.23 | 0.003 | 0.0009 | 0.048 | 0.0045 | 0.37 | 0.18 | 0.020 | — | — |
| M | 0.168 | 0.48 | 1.06 | 0.011 | 0.0010 | 0.032 | 0.0031 | 0.29 | 0.24 | 0.048 | — | — |

TABLE 11

| Steel sheet | Steel | TS (MPa) | EL (%) | $\lambda$ (%) | Structure | Precipitate grain size (nm) | Precipitate composition ratio Ti/Mo | Remarks |
|---|---|---|---|---|---|---|---|---|
| 1 | A | 961 | 20.9 | 83 | F | 5 | 0.96 | Inventive example |
| 2 | B | 990 | 19.6 | 81 | F | 5 | 0.89 | Inventive example |
| 3 | C | 1003 | 18.5 | 80 | F | 6 | 1.38 | Inventive example |
| 4 | D | 1052 | 16.9 | 97 | F | 6 | 1.04 | Inventive example |
| 5 | E | 1048 | 16.0 | 83 | F | 5 | 1.94 | Inventive example |
| 6 | F | 965 | 20.1 | 101 | F | 6 | 0.59 | Inventive example |
| 7 | G | 994 | 19.0 | 96 | F | 5 | 0.79 | Inventive example |
| 8 | H | 992 | 19.0 | 105 | F | 5 | 0.96 | Inventive example |
| 9 | I | 999 | 18.3 | 81 | F | 5 | 1.04 | Inventive example |
| 10 | J | 991 | 16.1 | 21 | F + P | 15 | — | Comparative example |

TABLE 11-continued

| Steel sheet | Steel | TS (MPa) | EL (%) | λ (%) | Structure | Precipitate grain size (nm) | Precipitate composition ratio Ti/Mo | Remarks |
|---|---|---|---|---|---|---|---|---|
| 11 | K | 973 | 16.6 | 41 | F | 16 | — | Comparative example |
| 12 | L | 988 | 14.7 | 23 | F + M | 7 | 1.13 | Comparative example |
| 13 | M | 992 | 16.0 | 68 | F + P | 13 | 3.00 | Comparative example |

F: ferrite, P: pearlite. M: martensite.

EXAMPLE 9

Steels A to E having a chemical composition given in Table 12 were heated at a temperature of 1250° C., then hot rolled at a finishing temperature of 890° C., and coiled at a temperature of 520° C., by which steel sheets 1 to 5 with a thickness of 3.2 mm were manufactured. Thereafter, as in the case of example 4, the tensile properties and hole expanding ratio were investigated in the central and edge portions in the width direction of steel sheet. Also, precipitates were investigated under a transmission electron microscope.

The results are given in Table 13.

For the steel sheets 1 to 4 of examples of this invention, the variation in properties was very small.

On the other hand, for the steel sheet 5 of comparative example, only Ti is contained as a carbide/nitride forming element, so that EL and λ were low, and the variation in properties was large.

TABLE 12

| | Chemical composition (wt %) | | | | | | | | | | | | |
|---|---|---|---|---|---|---|---|---|---|---|---|---|---|
| Steel | C | Si | Mn | P | S | Al | N | Ti | Nb | Mo | Cr | W | Ti/(Mo + W) | Structure |
| A | 0.048 | 0.01 | 1.48 | 0.008 | 0.001 | 0.045 | 0.0038 | 0.081 | 0.010 | 0.16 | 0.050 | 0.071 | 0.8 | F |
| B | 0.048 | 0.03 | 1.49 | 0.008 | 0.001 | 0.043 | 0.0037 | 0.088 | 0.012 | 0.15 | 0.051 | 0.098 | 0.9 | F |
| C | 0.049 | 0.02 | 1.50 | 0.007 | 0.001 | 0.044 | 0.0035 | 0.085 | 0.013 | 0.10 | 0.052 | 0.200 | 0.8 | F |
| D | 0.047 | 0.01 | 1.50 | 0.008 | 0.001 | 0.045 | 0.0035 | 0.087 | 0.012 | — | 0.055 | 0.400 | 0.8 | F |
| E | 0.043 | 0.01 | 1.53 | 0.005 | 0.001 | 0.044 | 0.0034 | 0.186 | 0.009 | — | 0.051 | — | — | F |

F: ferrite

TABLE 13

| Steel sheet | Steel | Tensile properties | | | Variation in properties | | Remarks |
|---|---|---|---|---|---|---|---|
| | | TS (MPa) | EL (%) | λ (%) | ΔTS | ΔEL | |
| 1 | A | 813 | 22 | 100 | 8 | 1.0 | Inventive example |
| 2 | B | 822 | 20 | 105 | 13 | 1.2 | Inventive example |
| 3 | C | 801 | 23 | 110 | 5 | 1.1 | Inventive example |
| 4 | D | 808 | 21 | 108 | 3 | 0.9 | Inventive example |
| 5 | E | 762 | 17 | 60 | 35 | 3.8 | Comparative example |

What is claimed is:

1. A high strength hot rolled steel sheet containing 0.15% or less C, 0.02 to 0.35% Ti, and 0.05 to 0.7% Mo by weight percentage and consisting essentially of a matrix of ferrite structure single phase and fine precipitates with a grain size of smaller than 10 nm dispersed in said matrix.

2. A high strength hot rolled steel sheet containing 0.15% or less C, 0.02 to 0.35% Ti, and 0.01 to 1.5% W by weight percentage and consisting essentially of a matrix of ferrite structure single phase and fine precipitates with a grain size of smaller than 10 nm dispersed in said matrix.

3. A high strength hot rolled steel sheet containing 0.15% or less C, 0.02 to 0.35% Ti, 0.05 to 0.7% Mo, and 0.01 to 1.5% W by weight percentage and consisting essentially of a matrix of ferrite structure single phase and fine precipitates with a grain size of smaller than 10 nm dispersed in said matrix.

4. The high strength hot rolled steel sheet according to claim 1, wherein said fine precipitates are dispersed at a number per unit volume of $5 \times 10^4/\mu m^3$ or higher.

5. The high strength hot rolled steel sheet according to claim 2, wherein said fine precipitates are dispersed at a number per unit volume of $5 \times 10^4/\mu m^3$ or higher.

6. The high strength hot rolled steel sheet according to claim 3, wherein said fine precipitates are dispersed at a number per unit volume of $5 \times 10^4/\mu m^3$ or higher.

7. The high strength hot rolled steel sheet according to claim 1, wherein the grain size of Fe carbides is smaller than 1 $\mu m$, and the volume percentage thereof is 1% or lower.

8. The high strength hot rolled steel sheet according to claim 4, wherein the grain size of Fe carbides is smaller than 1 $\mu m$, and the volume percentage thereof is 1% or lower.

9. The high strength hot rolled steel sheet according to claim 4, wherein the contents of C, Ti and Mo represented by weight percentage satisfy the equation of $0.8 \leq (C/12)/[(Ti/48)+(Mo/96)] \leq 1.3$.

10. The high strength hot rolled steel sheet according to claim 4, wherein the contents of Ti and Mo represented by atomic percentage in fine precipitates satisfy the equation of $0.1 \leq Ti/Mo \leq 3$.

11. The high strength hot rolled steel sheet according to claim 4, wherein at least one element selected from 0.08% or less Nb and 0.15% or less V is further contained, and the contents of Ti, Mo, Nb and V represented by atomic percentage in fine precipitates satisfy the equation of $0.25 \leq \text{Mo}/(\text{Ti}+\text{Nb}+\text{V}+\text{Mo})$.

12. The high strength hot rolled steel sheet according to claim 4, wherein said steel sheet consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo by weight percentage, and the balance being Fe.

13. The high strength hot rolled steel sheet according to claim 4, wherein said steel sheet consists essentially of 0.06% or less C, 0.5% or less Si, 0.5 to 2.0% Mn, 0.06% or less P, 0.005% or less S, 0.1% or less Al, 0.006% or less N, 0.02 to 0.10% Ti, 0.05 to 0.6% Mo, at least one element selected from 0.08% or less Nb and 0.15% or less V by weight percentage, and the balance being Fe.

14. The high strength hot rolled steel sheet according to claim 4, wherein said steel sheet consists essentially of more than 0.06% and 0.15% or less C, 0.5% or less Si, 0.5 to 2.0% Mn, 0.06% or less P, 0.005% or less S, 0.1% or less Al, 0.006% or less N, more than 0.10% and 0.35% or less Ti, 0.3 to 0.7% Mo by weight percentage, and the balance being Fe.

15. The high strength hot rolled steel sheet according to claim 5, wherein said steel sheet consists essentially of 0.1% or less C, 0.5% or less Si, 2% or less Mn, 0.06% or less P, 0.01% or less S, 0.1% or less Al, 0.006% or less N, 0.5% or less Cr, 0.02 to 0.2% Ti, 0.08% or less Nb, 0.01 to 1.5% W by weight percentage, and the balance being Fe, and the contents of Ti and W represented by atomic percentage in fine precipitates satisfy the equation of $0.1 \leq \text{Ti}/\text{W}$.

16. The high strength hot rolled steel sheet according to claim 6, wherein said steel sheet consists essentially of 0.1% or less C, 0.5% or less Si, 2% or less Mn, 0.06% or less P, 0.01% or less S, 0.1% or less Al, 0.006% or less N, 0.5% or less Cr, 0.02 to 0.2% Ti, 0.08% or less Nb, 0.05 to 0.6% Mo, 0.01 to 1.5% W by weight percentage, and the balance being Fe, and the contents of Ti, Mo and W represented by atomic percentage in fine precipitates satisfy the equation of $0.1 \leq \text{Ti}/(\text{Mo}+\text{W})$.

17. The high strength hot rolled steel sheet according to claim 12, wherein the content of solid solution C is 0.0020% or lower by weight percentage.

18. The high strength hot rolled steel sheet according to claim 13, wherein the content of solid solution C is 0.0020% or lower by weight percentage.

19. The high strength hot rolled steel sheet according to claim 14, wherein the content of solid solution C is 0.0020% or lower by weight percentage.

20. The high strength hot rolled steel sheet according to claim 12, wherein the equation of $(\text{Si}+\text{Mo}) \leq 0.5\%$ is satisfied by weight percentage.

21. The high strength hot rolled steel sheet according to claim 13, wherein the equation of $(\text{Si}+\text{Mo}) \leq 0.5\%$ is satisfied by weight percentage.

22. The high strength hot rolled steel sheet according to claim 14, wherein the equation of $(\text{Si}+\text{Mo}) \leq 0.5\%$ is satisfied by weight percentage.

23. A galvanized steel sheet obtained by hot dip galvanizing the high strength hot rolled steel sheet of claim 12.

24. A galvanized steel sheet obtained by hot dip galvanizing the high strength hot rolled steel sheet of claim 13.

25. A galvanized steel sheet obtained by hot dip galvanizing the high strength hot rolled steel sheet of claim 14.

26. An automotive chassis part using the high strength hot rolled steel sheet of claim 12.

27. An automotive chassis part using the high strength hot rolled steel sheet of claim 13.

28. An automotive chassis part using the high strength hot rolled steel sheet of claim 14.

29. An automotive chassis part using the high strength hot rolled steel sheet of claim 12 which has hole expanding ratio of 80% or higher and tensile strength TS of not lower than 700 MPa, and in which TS, elongation EL (%), and sheet thickness t (mm) satisfy the equation of $(\text{TS} \times \text{EL})/t^{0.2} > 12000$.

30. An automotive chassis part using the high strength hot rolled steel sheet of claim 13 which has hole expanding ratio of 80% or higher and tensile strength TS of not lower than 700 MPa, and in which TS, elongation EL (%), and sheet thickness t (mm) satisfy the equation of $(\text{TS} \times \text{EL})/t^{0.2} > 12000$.

31. An automotive chassis part using the high strength hot rolled steel sheet of claim 14 which has hole expanding ratio of 80% or higher and tensile strength TS of not lower than 700 MPa, and in which TS, elongation EL (%), and sheet thickness t (mm) satisfy the equation of $(\text{TS} \times \text{EL})/t^{0.2} > 12000$.

* * * * *